United States Patent [19]

Kordesch

[11] 4,174,565
[45] Nov. 20, 1979

[54] METHOD OF PRECHARGING RECHARGEABLE METAL OXIDE-HYDROGEN CELLS

[75] Inventor: Karl V. Kordesch, Lakewood, Ohio

[73] Assignee: Union Carbide Corporation, New York, N.Y.

[21] Appl. No.: 890,986

[22] Filed: Mar. 28, 1978

Related U.S. Application Data

[62] Division of Ser. No. 810,789, Jun. 28, 1977, abandoned.

[51] Int. Cl.² .............................................. H01M 10/28
[52] U.S. Cl. .................................. 29/623.2; 429/219; 429/223; 429/101
[58] Field of Search .......................... 29/623.2, 623.1; 429/101, 223, 206, 207, 218, 219, 40, 42, 46, 17, 19, 27

[56] References Cited

U.S. PATENT DOCUMENTS

| | | | |
|---|---|---|---|
| 3,669,744 | 6/1972 | Tsenter et al. | 429/223 |
| 3,867,199 | 2/1975 | Dunlop et al. | 429/223 |
| 3,959,018 | 5/1976 | Dunlop et al. | 429/46 |
| 4,038,461 | 7/1977 | Warnock | 429/101 |

Primary Examiner—Francis S. Husar
Assistant Examiner—Daniel C. Crane
Attorney, Agent, or Firm—Robert C. Cummings

[57] ABSTRACT

A rechargeable cell having a metal oxide positive electrode and a hydrogen gas negative electrode is manufactured in accordance with the present invention with a predetermined quantity of hydrogen gas by inserting a metallic member, selected from the group consisting of aluminum, zinc and magnesium, within the cell at a location adapted to contact the aqueous alkaline electrolyte and hermetically sealing the cell.

5 Claims, 1 Drawing Figure

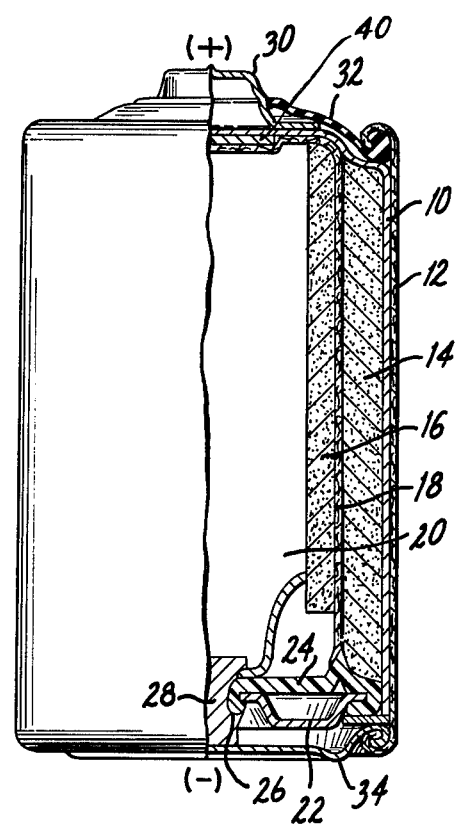

METHOD OF PRECHARGING RECHARGEABLE METAL OXIDE-HYDROGEN CELLS

The application is a division of our prior U.S. application Ser. No. 810,789, filing date June 28, 1977 now abandoned.

The present invention relates to rechargeable metal oxide-hydrogen cells and to a method of precharging such cells with hydrogen gas.

Heretofore if it was desired to add a predetermined quantity of hydrogen gas to a metal oxide rechargeable cell having a hydrogen electrode, this could only be done by means of an external hydrogen gas supply. A hydrogen precharge is necessary in a rechargeable cell having a hydrogen electrode regardless of the charge state of the positive electrode during cell assembly. For example, a cell containing a positive $MnO_2$ electrode, which is conventionally assembled in its charged state, requires a precharge of hydrogen sufficient to establish an initial anodic capacity proportional to the initial cathodic capacity. Alternatively, other metal oxide positive electrodes, particularly nickel oxide which is conventionally assembled in its discharged state, also require a hydrogen gas precharge in order to provide an imbalance on the anodic side. In the latter case, this added hydrogen is gradually consumed in the formation of the nickel oxide cathode during the first few cycles. Without this precharge, the capacity of the cell is limited to the amount of hydrogen evolved during the charging periods as established by the nickel oxide capacity and reduced by the initial inefficiency of the nickel oxide cathode, i.e., from early oxygen evolution which consumes hydrogen by producing water catalytically.

The hydrogen gas precharge has been provided in the past through a feed line from an external gas supply. The feeder line was thereafter permanently sealed or closed off by a valve mechanism. It has been discovered in accordance with the present invention that the required hydrogen precharge for any metal oxide hydrogen cell can be developed in-situ, within the interior of the hermetically sealed cell, thereby eliminating structural constraints on the cell design related to the prior need for an external gas supply and coupling equipment. The cost advantages in the manufacture of such a cell are substantial.

Accordingly, it is the principal object of the present invention to provide a rechargeable hermetically sealed metal oxide hydrogen cell which incorporates means for developing a predetermined quantity of hydrogen gas in-situ.

It is a further object of the present invention to provide a method of precharging an hermetically sealed rechargeable cell with a predetermined quantity of hydrogen gas.

Other objects and advantages of the present invention will become apparent from the following detailed description when taken in conjunction with the accompanying drawing which is an elevation view in partial section of a round cell embodying the present invention.

The drawing illustrates the preferred embodiment of the invention for a round cell construction. It should, however, be understood that the underlying invention is equally applicable to other conventional cell configurations as well as other round cell constructions. The cell shown in the drawing comprises a metallic container 10 of cylindrical geometry, an insulating outer jacket 12, a positive electrode 14, a hydrogen gas negative electrode 16 and a porous ionically permeable separator 18. The positive electrode 14 is preferably in the form of a sheel abutting the interior surface of the container 10. The hydrogen gas negative electrode 16, as will be described in greater detail hereafter, is spirally wound in a coiled configuration concentric with the positive electrode and the longitudinal axis of the cell. A cavity 20 of predetermined volume relative to the size of the cell is left unfilled in the center of the cell. In accordance with the present invention a controlled amount of hydrogen gas is formed in-situ within this central cavity 20.

The active material in the positive electrode 14 may be any conventional electrochemically reversible metal oxide compound such as $MnO_2$, $NiOOH$, $AgO$, $Ag_2O$ and $HgO$. The positive electrode is preferably formed by press molding a mixture of the metal oxide particles in combination with non-reactive electrically conductive particles and a binder against the interior side walls of the metallic container 10 using known methods and techniques.

The hydrogen gas negative electrode 16 may be any conventional fuel cell electrode, preferably one comprising a multi-layer structure having a catalyzed surface layer for dissociating and ionizing molecular hydrogen. Typical multi-layer structures which may be used in the present invention are shown and described in U.S. Pat. No. 3,423,247 and U.S. Pat. No. 3,556,856 respectively, the disclosures of which are incorporated herein by reference. U.S. Pat. No. 3,423,247 discloses a fuel cell electrode having at least two zones wherein each zone may be made up of a number of separate layers. One zone is partially wetted by the liquid electrolyte and contains carbon catalyzed with a noble metal; whereas, the second zone contains uncatalyzed electrically conductive particles and is highly liquid repellent. U.S. Pat. No. 3,556,856 discloses a three-layer fuel cell electrode having a first porous metal layer of, for example, nickel with very fine pores, a second central layer of a porous metal which may also be nickel but with very coarse pores and a third layer of an active material such as activated carbon catalyzed with a noble metal. A third alternative construction for the hydrogen gas negative electrode 16 may comprise a layer of active material such as carbon catalyzed with a noble metal which is simply formed into a sheet containing a wetproofing agent such as polytetrafluorethylene and pressed or calendered onto a porous metal layer such as a nickel screen or expanded nickel. An additional wetproofing layer of polytetrafluorethylene may be sprayed or layered onto the opposite side of the porous metal layer. After forming the multi-layer hydrogen electrode 16 it is rolled into a coiled configuration and inserted into the cell. The catalytically active material surface in general faces the central cavity 20, although for the aforementioned third alternative construction, the active surface is preferably positioned to face the separator 18. In the latter case it is also preferred to use a double layered separator.

The separator 18 separates the positive electrode 14 from the negative electrode 16 and may be constructed from any conventional standard nonwoven synthetic fabric such as that sold commercially under the trademark "Pellon" or from a modacrylic or polypropylene fabric. When a second layer of separator is desired, it may be composed of a fibrous cellulose material. Each layer of separator 18 may consist of one or more discrete strips extending in a "U" configuration between the positive electrode 14 and the negative electrode 16 and contacting the metallic container 10 at the positive end of the cell. Alternatively, a cup shaped separator 18 may be inserted into the cell after the positive electrode 14 has been molded against the container 10. The separator 18 is wetted with an aqueous NaOH or KOH electrolyte solution at a standard concentration of, for example, 7N, following a conventional procedure for introducing electrolyte.

The positive end of the cell, shown as the top of the cell in the accompanying drawing, includes a metal terminal cap 30 in electrical contact with the metallic container 10 and an insulating member 32 which is biased against the cap 30 and locked in engagement with the outer jacket 12.

The negative or bottom end of the cell includes a conventional seal closure, such as that shown in the accompanying drawing and substantially disclosed in U.S. Pat. No. 4,011,103. This closure comprises a rigid metallic plate 22 which is both liquid and gas-tightly sealed within the open end of the metal container 10 in conjunction with a nylon gasket 24 having a central opening 26. This opening is of a diameter slightly smaller than the external diameter of a metallic rivet 28. The rivet 28 is driven through the opening 26, and a compression seal is formed by the application of radial force on that area where the top edge of metal container 10, the peripheral edge of gasket 24 and the peripheral edge of metallic cover plate 34 meet. Prior to driving rivet 28 through the gasket 24, the rivet is attached to the metallic collector 30 which is connected to the negative electrode 16.

To generate the hydrogen precharge in-situ, a metallic member 40 composed of aluminum, zinc or magnesium is inserted into the cell during its assembly at any desired location adapted to make contact with the electrolyte. Aluminum is the preferred metal for the member 40. The preferred location is underneath the separator layer 18 at the bottom end of the cell. In this position the separator 18, which absorbs the electrolyte added to the cell, assures contact between the member 40 and the electrolyte regardless of the physical orientation of the cell following assembly. Alternatively, metallic member 40 may be wrapped in an absorbent material which is wetted with the alkaline electrolyte, and the wrapped member is then placed in the cell. Once the electrolyte contacts the aluminum member 40 the following reaction occurs:

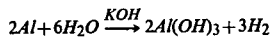

$$2Al + 6H_2O \xrightarrow{KOH} 2Al(OH)_3 + 3H_2$$

The reaction product Al(OH)$_3$ is chemically inactive in the cell. The quantity of hydrogen generated is proportional to the weight of the aluminum member 40. The aluminum member should preferably be in a solid form which will prolong the reaction time to over a period of hours as opposed to, e.g., powdered aluminum which reacts quickly. For a D-size cell, for instance, 0.05 gram of a solid aluminum body, e.g., a piece of aluminum foil, has been found adequate to provide a slow gradually developing hydrogen gas pressure of 50 to 100 psi.

Since the reaction of the solid aluminum with alkaline electrolyte proceeds slowly, the cell can be sealed to complete the cell assembly in the conventional manner as hereinbefore described without significant loss of hydrogen gas. When either zinc or magnesium is used in place of aluminum, the reaction product will be either zinc oxide or hydroxide or magnesium hydroxide and hydrogen respectively.

When the cell is charged, the hydrogen pressure increases but is limited by the built-in cathodic capacity of the cell. When the oxygen gassing point is reached, only water is produced by the overcharge recombination reaction.

An alternative teaching of the present invention for generating hydrogen in-situ involves the incorporation of aluminum particles in the hydrogen gas negative electrode 16. An example of this would be to use a Raney nickel alloy composition for preparing the hydrogen gas negative electrode 16. A Raney nickel alloy composition is well known for use in making active hydrogen-storing materials. A nickel alloy of, for example, nickel-aluminum or nickel-zinc in a proportion by volume of about 80:20% may be formed into an active Raney nickel hydrogen-storage material by leaching out the aluminum or zinc following a conventional procedure such as taught in Kalte Verbrennung Fuel Cells, E. W. Justi and A. W. Winsel, Franz Steiner Verlag GNBH, Wiesbaden, 1962, pp. 116 ff. Accordingly, by retaining a sufficient percentage of the aluminum or zinc particles in the electrode, the electrode itself may be used to precharge the cell in-situ on contact with the alkaline electrolyte.

What is claimed is:

1. A method of manufacturing a sealed rechargeable cell with a precharge of hydrogen gas, said cell containing a metal oxide positive electrode, a hydrogen gas negative electrode separated from said positive electrode and an aqueous alkaline electrolyte, comprising the steps of: inserting a metallic member within said cell at a location adapted to contact said alkaline electrolyte, said metallic member being in the form of a solid body composed of a metal selected from the group consisting of aluminum, zinc and magnesium; and hermetically sealing said cell whereby a predetermined quantity of hydrogen gas is generated in-situ, within said cell, over a controlled period of time from a reaction by said member on contact with said electrolyte and with said reaction providing an inactive reaction product.

2. A method as defined in claim 1 wherein said alkaline electrolyte comprises an aqueous potassium hydroxide solution.

3. A method as defined in claim 2 wherein said metallic member is aluminum and wherein said reaction product is Al$_2$O$_3$.

4. A method as defined in claim 2 wherein said metallic member is zinc and wherein said reaction product is an oxide of zinc.

5. A method as defined in claim 2 wherein said metallic member is magnesium and said reaction product is magnesium hydroxide.

* * * * *